United States Patent
Hanser et al.

(10) Patent No.: US 9,994,141 B1
(45) Date of Patent: Jun. 12, 2018

(54) RETRACTABLE PLATFORM AND STAIRCASE FOR A RECREATIONAL VEHICLE

(71) Applicant: HWH Corporation, Moscow, IA (US)

(72) Inventors: Paul Hanser, Tipton, IA (US); Vincent Buls, Tipton, IA (US)

(73) Assignee: MWH Corporation, Moscow, IA (US)

( * ) Notice: Subject to any disclaimer, the term of this patent is extended or adjusted under 35 U.S.C. 154(b) by 0 days. days.

(21) Appl. No.: 15/603,703

(22) Filed: May 24, 2017

Related U.S. Application Data

(60) Provisional application No. 62/371,977, filed on Aug. 8, 2016.

(51) Int. Cl.
  *B60P 3/36* (2006.01)
  *B60R 3/02* (2006.01)

(52) U.S. Cl.
  CPC . *B60P 3/36* (2013.01); *B60R 3/02* (2013.01)

(58) Field of Classification Search
  CPC .................................... B60P 3/02; B60P 3/36
  See application file for complete search history.

(56) References Cited

U.S. PATENT DOCUMENTS

| | | | |
|---|---|---|---|
| 457,040 A | 8/1891 | Baugh | |
| 2,857,197 A * | 10/1958 | Hogg | B60P 3/36 296/171 |
| 2,867,471 A * | 1/1959 | Coon, Jr. | B60P 3/36 108/44 |
| 3,291,504 A | 12/1966 | Irizarry | |
| 3,906,690 A * | 9/1975 | Miriani | E04F 11/04 182/88 |
| 4,185,849 A | 1/1980 | Jaeger | |
| 4,299,528 A | 11/1981 | Kazeil et al. | |
| 4,347,638 A * | 9/1982 | Weaver | B60R 3/02 14/71.1 |
| 4,583,466 A * | 4/1986 | Reddy | B61D 23/02 105/443 |
| 4,623,160 A | 11/1986 | Trudell | |
| 4,747,243 A * | 5/1988 | Anstead | E04B 1/34336 52/182 |
| 5,026,243 A * | 6/1991 | Dell | B65G 69/30 14/71.1 |
| 5,228,707 A * | 7/1993 | Yoder | B60R 3/02 182/127 |

(Continued)

FOREIGN PATENT DOCUMENTS

| | | | | |
|---|---|---|---|---|
| DE | 19929357 A1 * | 1/2001 | ................ | B60P 3/36 |
| DE | 19929357 A1 * | 1/2001 | ................ | B60P 3/36 |

(Continued)

*Primary Examiner* — Katherine W Mitchell
*Assistant Examiner* — Candace L Bradford
(74) *Attorney, Agent, or Firm* — Shuttleworth & Ingersoll, PLC; Jason Sytsma

(57) ABSTRACT

A frame mounted on the underside of the RV comprising two parallel tracks. A platform is mounted to the frame for movement about the frame between a retracted position underneath the RV and an extended position extending from the RV. The platform comprises of two parallel rails each of which is mounted to one of the two parallel tracks. A deck extends between the two parallel rails. A prime mover is mounted on one end to the platform and the other end is mounted to the frame to move the platform with respect to the frame.

9 Claims, 8 Drawing Sheets

(56) References Cited

U.S. PATENT DOCUMENTS

| | | | | |
|---|---|---|---|---|
| 5,369,921 | A * | 12/1994 | Glenn | B60P 3/36 182/113 |
| 5,375,962 | A * | 12/1994 | Kempf | B60R 3/02 414/539 |
| 5,505,476 | A | 4/1996 | Maccabee | |
| 5,547,040 | A | 8/1996 | Hanser et al. | |
| 5,584,493 | A | 12/1996 | Demski et al. | |
| 5,957,237 | A | 9/1999 | Tigner | |
| 6,062,805 | A * | 5/2000 | Tremblay | A61G 3/06 414/540 |
| 6,082,751 | A | 7/2000 | Hanes et al. | |
| 6,213,486 | B1 | 4/2001 | Kunz et al. | |
| 6,347,849 | B1 * | 2/2002 | Muterthies | A47B 88/487 312/334.1 |
| 6,425,627 | B1 | 7/2002 | Gee | |
| 6,601,677 | B1 * | 8/2003 | Storm | B66B 9/0869 187/200 |
| 6,655,706 | B1 * | 12/2003 | Murrell | B60R 3/02 182/88 |
| 6,659,224 | B2 | 12/2003 | Medsker | |
| 6,869,092 | B1 * | 3/2005 | Henn | B60R 3/02 280/166 |
| 6,880,843 | B1 | 4/2005 | Greer, Jr. | |
| 7,448,637 | B2 | 11/2008 | Parker | |
| 7,857,337 | B2 | 12/2010 | Ferguson et al. | |
| 7,878,519 | B2 | 2/2011 | Hallmark | |
| 7,934,736 | B2 | 5/2011 | Kircher | |
| 8,002,298 | B2 | 8/2011 | Casbolt et al. | |
| 8,075,008 | B1 * | 12/2011 | Hansen | B60R 3/02 182/88 |
| 9,539,948 | B1 | 1/2017 | Presley et al. | |
| D788,945 | S * | 6/2017 | Meyer | D25/63 |
| 2002/0003340 | A1 | 1/2002 | Hallquist | |
| 2005/0285365 | A1 * | 12/2005 | Manser | B60R 3/02 280/163 |
| 2006/0181049 | A1 | 8/2006 | Kobayashi et al. | |
| 2006/0267308 | A1 * | 11/2006 | Decker, Jr. | B60Q 1/323 280/166 |
| 2007/0205573 | A1 * | 9/2007 | Hallmark | B60R 3/02 280/163 |
| 2007/0278760 | A1 | 12/2007 | VanBelle et al. | |
| 2007/0290475 | A1 * | 12/2007 | Reitinger | B60Q 1/323 280/164.1 |
| 2016/0096465 | A1 * | 4/2016 | Kauffman | B60P 3/36 296/162 |
| 2017/0055361 | A1 * | 2/2017 | Muhsam | H05K 7/1489 |
| 2017/0080842 | A1 * | 3/2017 | Rodabaugh | B60P 3/34 |
| 2018/0022262 | A1 * | 1/2018 | Roth | B60P 3/34 |

FOREIGN PATENT DOCUMENTS

| | | | | |
|---|---|---|---|---|
| DE | 102014002874 | A1 * | 9/2015 | B60P 3/02 |
| DE | 102014002874 | A1 * | 9/2015 | B60R 3/02 |
| DE | 202016004841 | U1 * | 1/2017 | B60P 3/36 |
| DE | 202016004841 | U1 * | 1/2017 | B60P 3/36 |

* cited by examiner

RETRACTABLE PLATFORM AND STAIRCASE FOR A RECREATIONAL VEHICLE

This application claims priority to U.S. Provisional Application No. 62/371,977 filed on Aug. 8, 2016, the contents of which are hereby incorporated by reference herein.

FIELD

This invention relates to a retractable platform and staircase, and more specifically to a retractable platform and staircase for a recreational vehicle.

BACKGROUND

The recreational vehicle (RV) industry has long employed ladders and step assemblies to assist entry and exit from the RV. Common RV design requires the use of five stairs to reach the main level due to the height from the ground. Typically, two external steps are used with three more inside the vehicle. When stairs are used inside the vehicle, however, the amount of useable floor space is greatly diminished.

In view of the foregoing, it is desirable to provide a retractable staircase for an RV that does not reduce the amount of useable floor area inside the vehicle.

SUMMARY

According to the present disclosure, there is provided a retractable platform and staircase for a recreational vehicle. In one implementation, the retractable platform and staircase comprises of a frame mounted on the underside of the RV comprising two parallel tracks. A platform is mounted to the frame for movement about the frame between a retracted position underneath the RV and an extended position extending from the RV. The platform comprises of two parallel rails each of which is mounted to one of the two parallel tracks. A deck extends between the two parallel rails. A prime mover is mounted on one end to the platform and the other end is mounted to the frame to move the platform with respect to the frame.

A retractable staircase is combined to the platform, and comprises of a plurality of steps. The steps are oriented such that the steps move between an extended position and a retracted position parallel to the longitudinal length of the RV. The retractable staircase can comprise of a first stationary rail attached to the platform and a second stationary rail attached to the platform. A first bearing pad is combined to the first stationary rail and a second bearing pad is combined to the second stationary rail. A first sliding rail is engaged against the first bearing pad and a second sliding rail is engaged against the second bearing pad. A first step is positioned between the first sliding rail and the second sliding rail. At least one stationary step is combined to the platform that moves with the platform between the extended position and the retracted position. The stationary step is positioned between the first stationary rail and the second stationary rail.

Other aspects, features, and embodiments of the invention will become apparent upon review of the following description taken in connection with the accompanying drawings. The invention, though, is pointed out with particularity by the appended claims.

BRIEF DESCRIPTION OF THE DRAWINGS

For a more complete understanding of particular embodiments and their features and advantages, reference is now made to the following description, in which.

DETAILED DESCRIPTION

Figure 1:
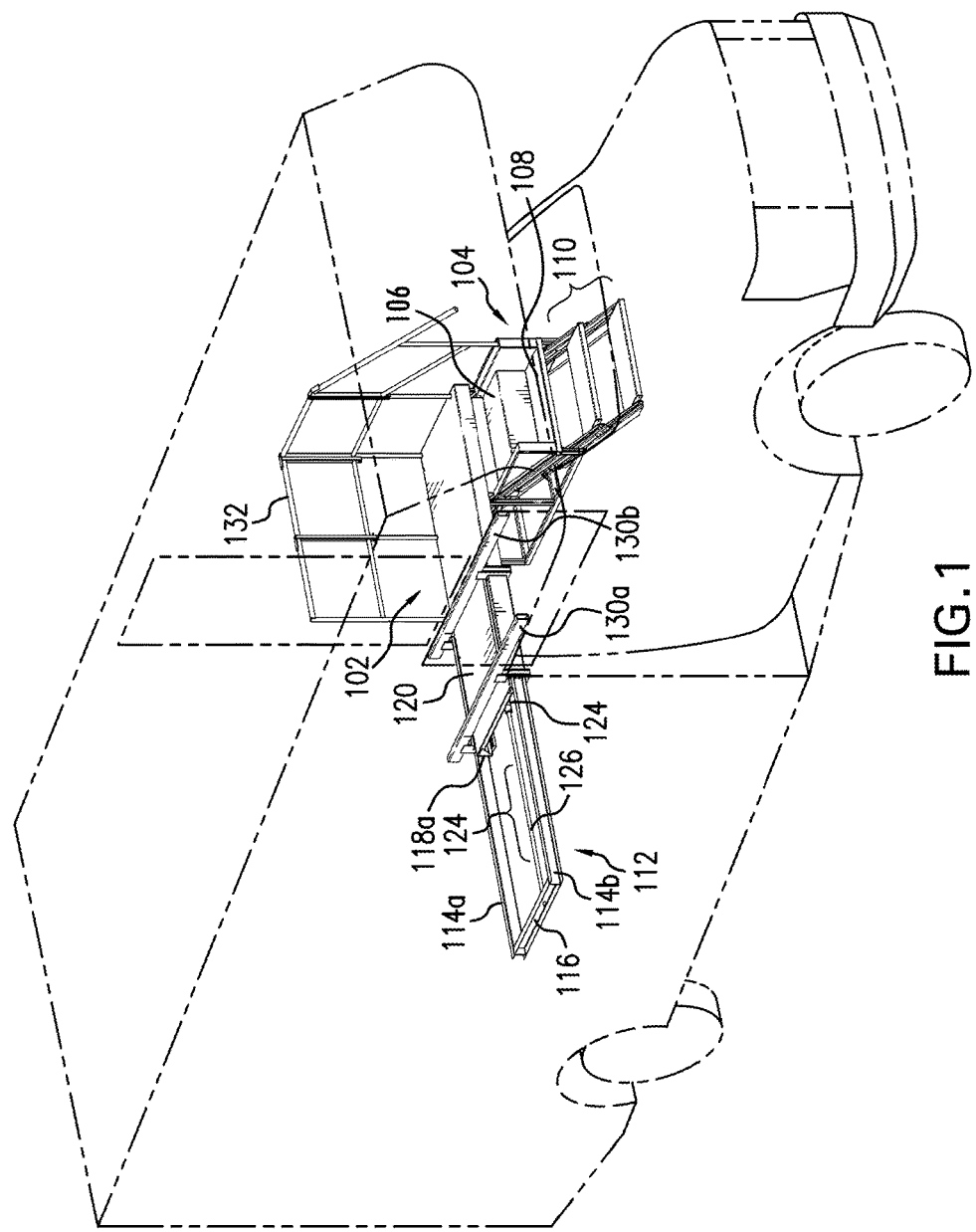
FIG. 1 is a perspective view of a retractable platform and staircase in accordance with an implementation of this disclosure in the extended position.

Reference will now be made to the drawings wherein like numerals refer to like parts throughout. FIGS. 1-13 show a retractable platform and staircase 100 for a recreational vehicle ("RV") according to this disclosure. Retractable platform and staircase 100 comprises of a platform 102 that extends outward from the vehicle that creates a landing for someone to stand on when entering or exiting through the door of the RV. A staircase 104 is mounted to the outboard end of platform 102 and extends perpendicular from platform 102, parallel with the RV.

Retractable platform and staircase 100 allows for the RV to have no internal steps so that no floor space is lost inside the RV. This also eliminates the need for a portable stepstool to make it easier to reach the first step of a traditional stairway. Platform 102 is mounted below the interior floor of the RV and above the frame rails of the chassis. This space allows the room for this element to be mounted and move.

Furthermore, the height of the interior floor to the ground requires a certain number of steps. If all the needed steps extended straight outward from the doorway of the RV there could be some concern with the steps running into the ground if the RV were parked alongside a berm or taking up more than the allotted space. Rotating the steps parallel to the RV sidewall allows retractable platform and staircase 100 to have more room, front to rear, to be stored since.

More specifically, staircase 104 can have one or more stationary steps 106, 108 followed by a set of telescoping steps 110 that extend outward from stationary steps 106, 108 to complete staircase 104 to the ground. The sequence of movement is controlled to extend platform 102 before steps 110 are extended. Likewise, platform 102 is not allowed to retract until telescoping steps 110 are fully retracted.

Retractable platform and staircase 100 comprises of a frame 112 mounted on the underside of the RV comprising two parallel tracks 114a, b and at least one longitudinal bar 116 extending therebetween. Platform 102 is mounted to frame 112 for movement between a retracted position and an extended position. Platform 102 comprises of two parallel rails 118 each of which is mounted to one of the two parallel tracks 114a, b. A deck 120 extends between the two parallel rails 118.

At least one first prime mover 124 is mounted on one end to platform 102 and another end to frame 112 for moving platform 102 with respect to frame 112. First prime mover 124 is a source of motive power for platform 102. First prime mover 124 can include a hydraulic cylinder and pneumatic cylinder, an electric cylinder, or the like. In the illustrated embodiment, first prime mover 124 is a hydraulic cylinder 124 connected to platform 102 and a piston 126 connected to longitudinal bar 116 of frame 112. First prime mover 124 can be mounted to a stationary point on one end of the recreational vehicle and then to platform 102 at the other end. The stroke and stationary mount for first prime mover 124 can change depending on its mounting location.

Figure 12:
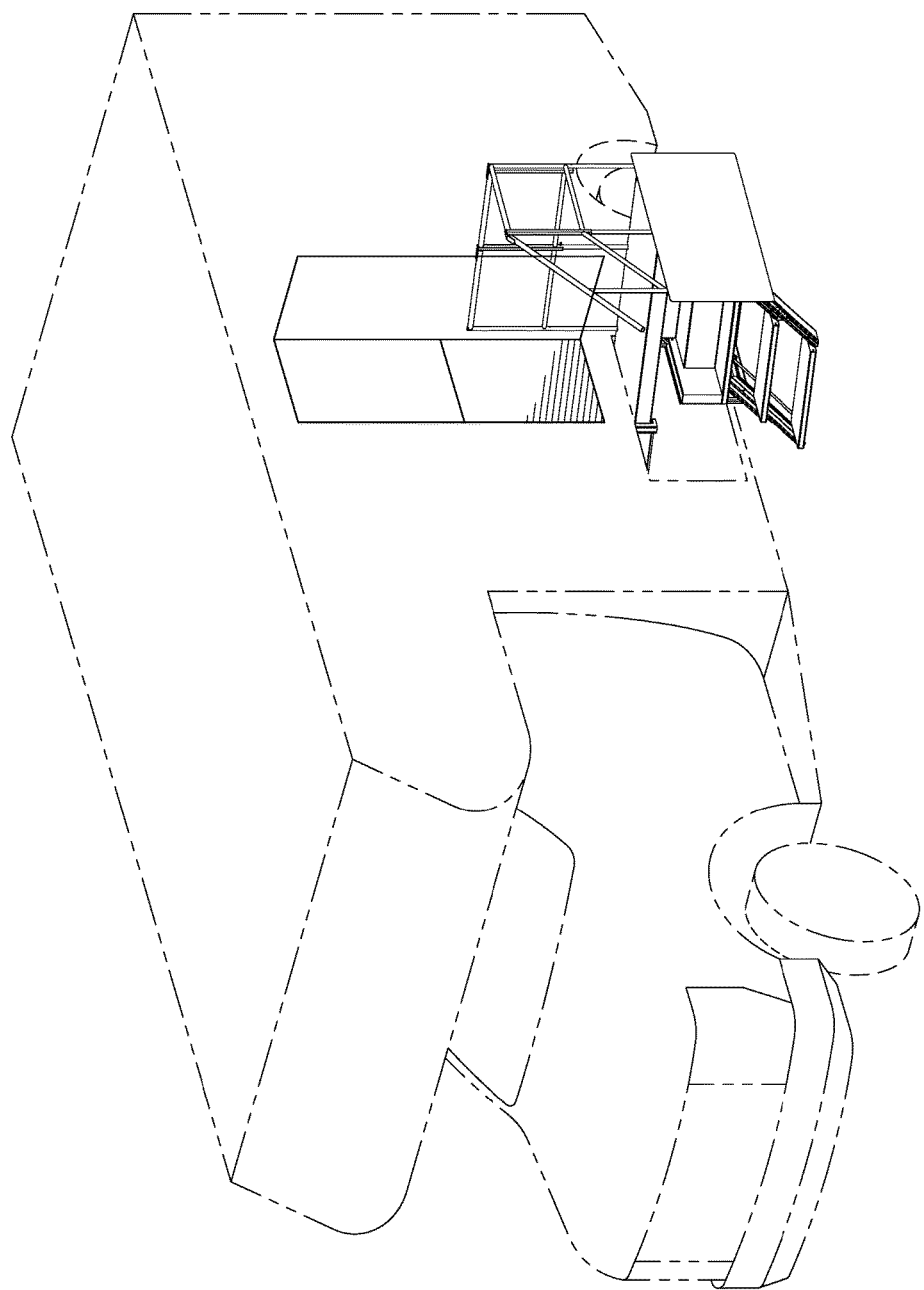
FIG. 12 shows the retractable platform and staircase of FIG. 1 attached to an RV and in the extended position.
Figure 13:
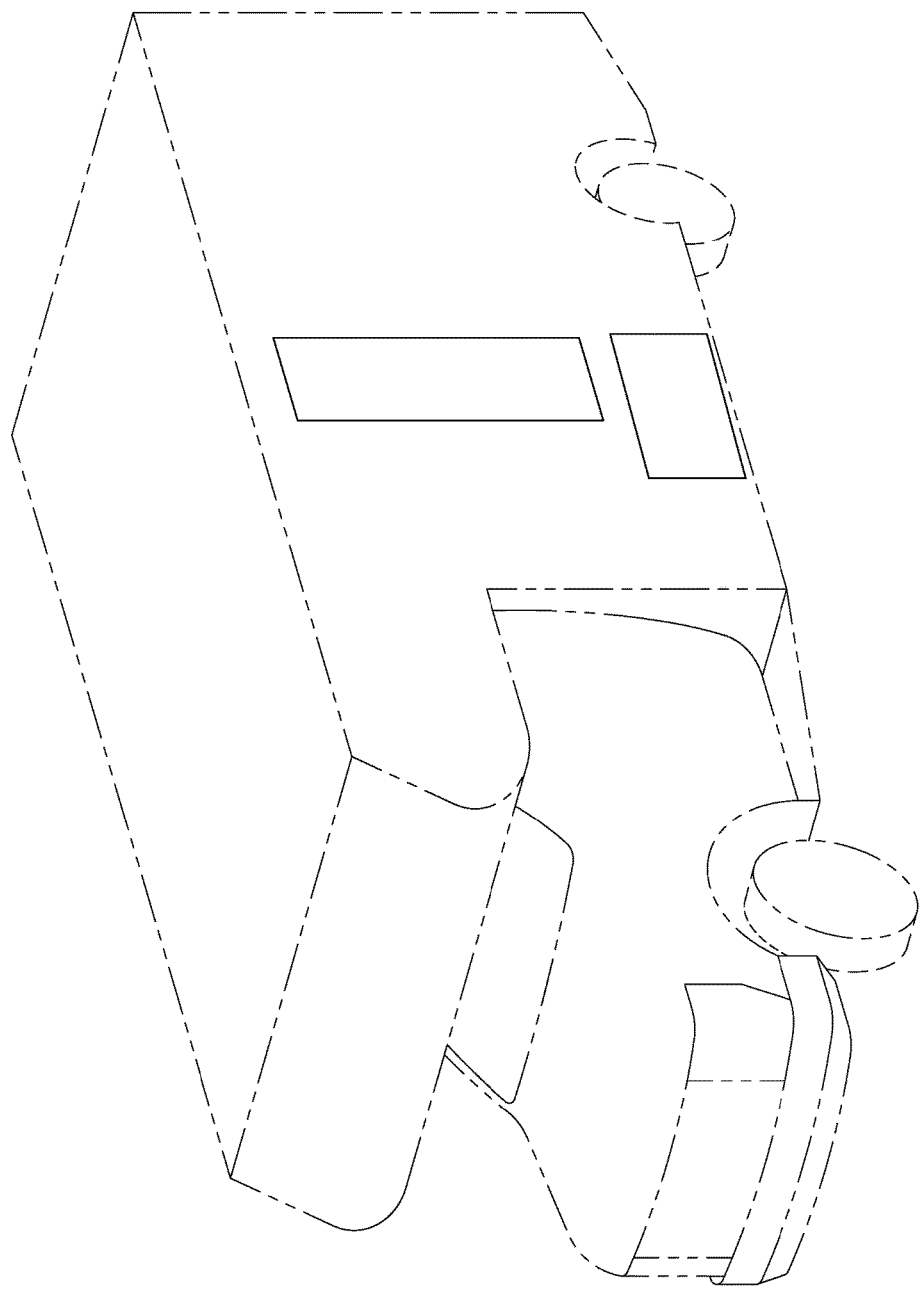
FIG. 13 shows the retractable platform and staircase of FIG. 1 attached to an RV and in the retracted position.

Returning to platform 102, deck 120 of the platform 102 is positioned under the frame of the RV, as shown in FIG. 12. There is a step down from the inside floor of the RV to deck 120 of platform 102. Frame 112 is positioned perpendicular with respect to a longitudinal length of the RV so that deck 120 of platform 102 extends perpendicular with a side of the RV.

A pair of cross members 130a, b are mounted above deck 120 perpendicular to parallel rails 118 of frame 112, to attach retractable platform and staircase 100 to the underside carriage of the RV.

A removable and replaceable hand rail 132 can be added for safety. Hand rail 132 must be removed before platform 102 can retract.

Figure 2:
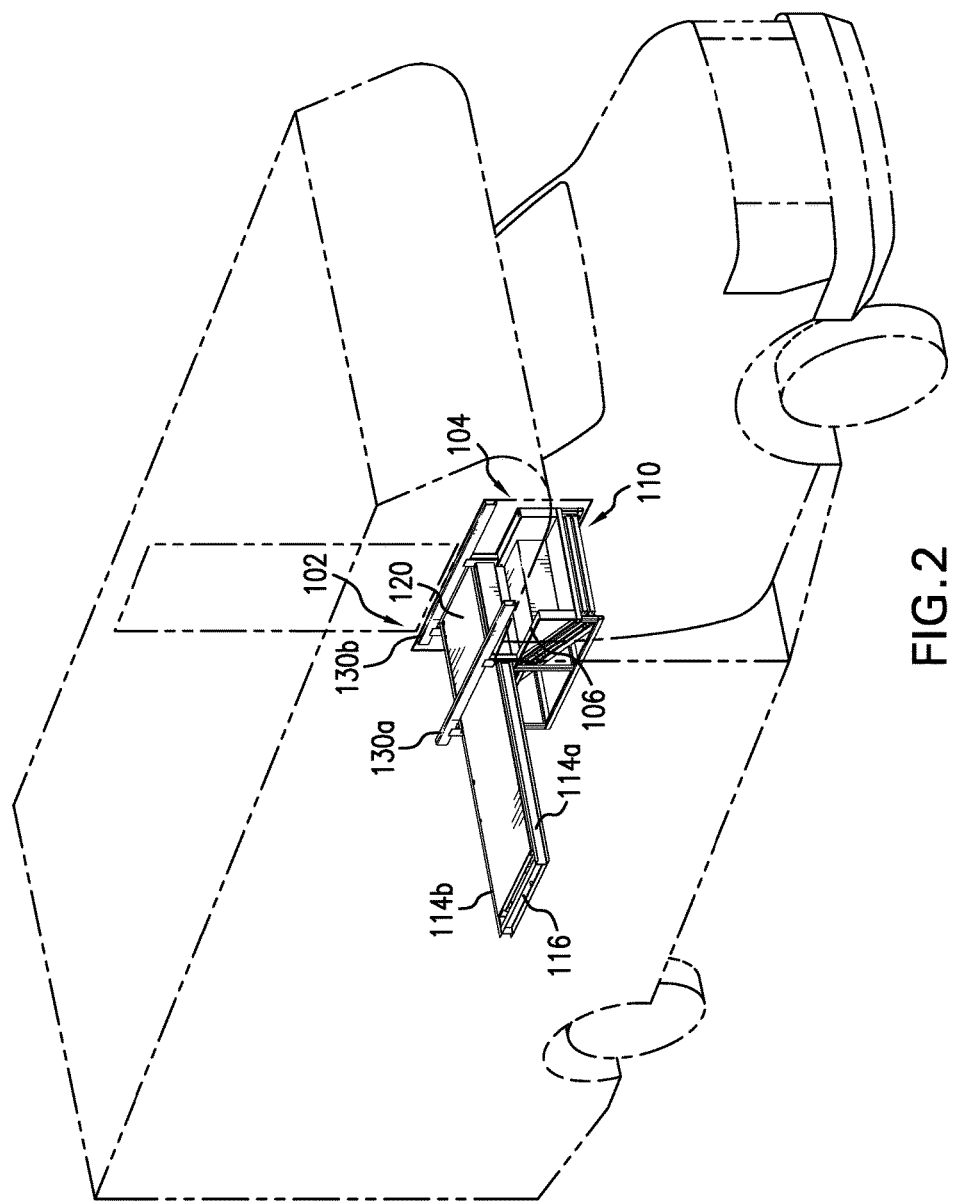
FIG. 2 is a perspective view of the retractable platform and staircase of FIG. 1 in the retracted position.

FIG. 2 shows retractable platform and staircase 100 fully retracted. Cross member 130b is generally inline or a behind the sideway with the exit door of the RV. Platform 102 is retracted behind or flush with cross member 130b so that it does not extend beyond the sidewall of the RV. In the extended position, as shown in FIG. 1, platform extends out from the sidewall of the RV.

Figure 3:
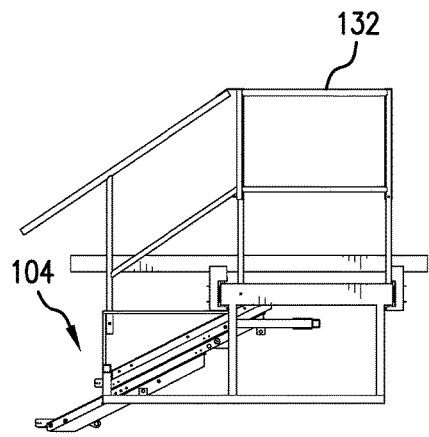
FIG. 3 is a side view of the retractable platform and staircase of FIG. 1 with the platform extended and the stairs partially extended.
Figure 4:
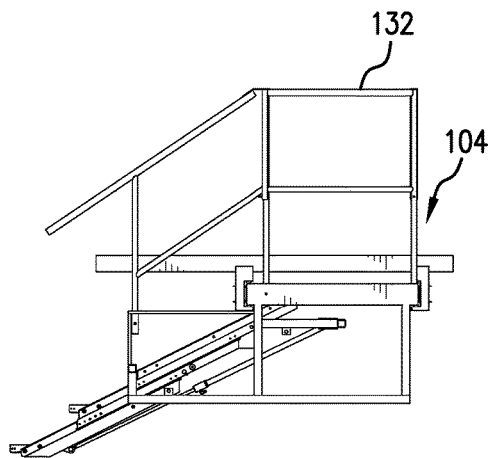
FIG. 4 is a side view of the retractable platform and staircase of FIG. 1 with the platform extended and the stairs extended.

FIGS. 3-4 show retractable platform and staircase 100 in various positions between fully extended and fully retracted. FIG. 4 shows retractable platform and staircase 100 fully extended. Platform 102 is extended out from the RV and staircase 104 is fully extended toward the ground. Hand rail 132 is also attached.

Figure 5:
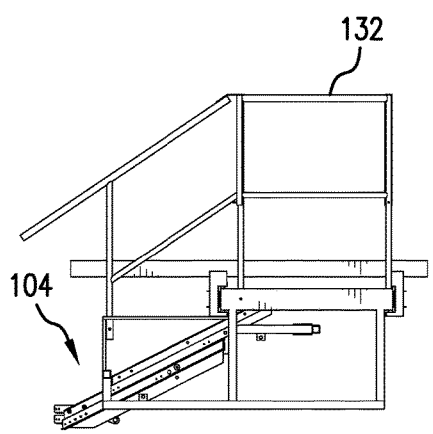
FIG. 5 is a side view of the retractable platform and staircase of FIG. 1 with the platform extended and the stairs partially extended.
Figure 6:
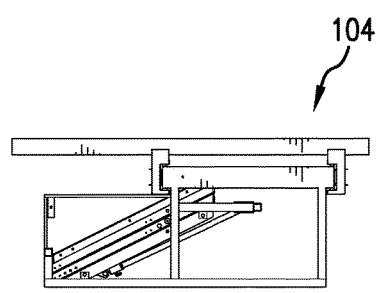
FIG. 6 is a side view of the retractable platform and staircase of FIG. 1 with the platform retracted and the stairs retracted.

FIG. 3 shows platform 102 fully extended and staircase 104 partially extended toward the ground. FIG. 5 is a similar view whereas one can be shown extending toward the ground and the other shown retracting from the ground. FIG. 6 shows platform fully retracted and the staircase fully retracted. FIG. 6 shows the footprint that retractable platform and staircase 100 consumes under the RV.

Staircase 104 is more particularly shown in FIGS. 7-11. A suitable staircase that could also be attached to platform 102 is described in U.S. Pat. No. 9,725,042, titled, Retractable Staircase for a Recreational Vehicle, filed on Jun. 29, 2016 by the same inventors. The contents of this application are hereby incorporated by reference herein.

Figure 7:
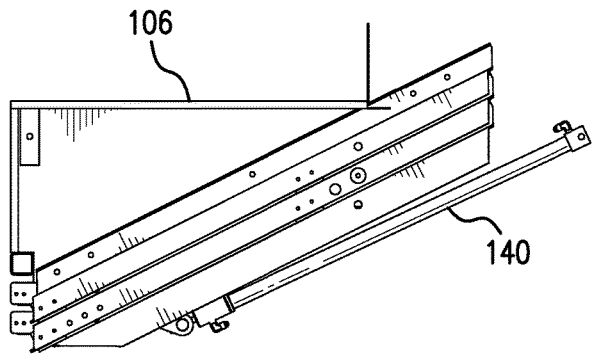
FIG. 7 is a close-up, side view of the retractable platform and staircase of FIG. 1 with the platform retracted and the stairs retracted.
Figure 8:
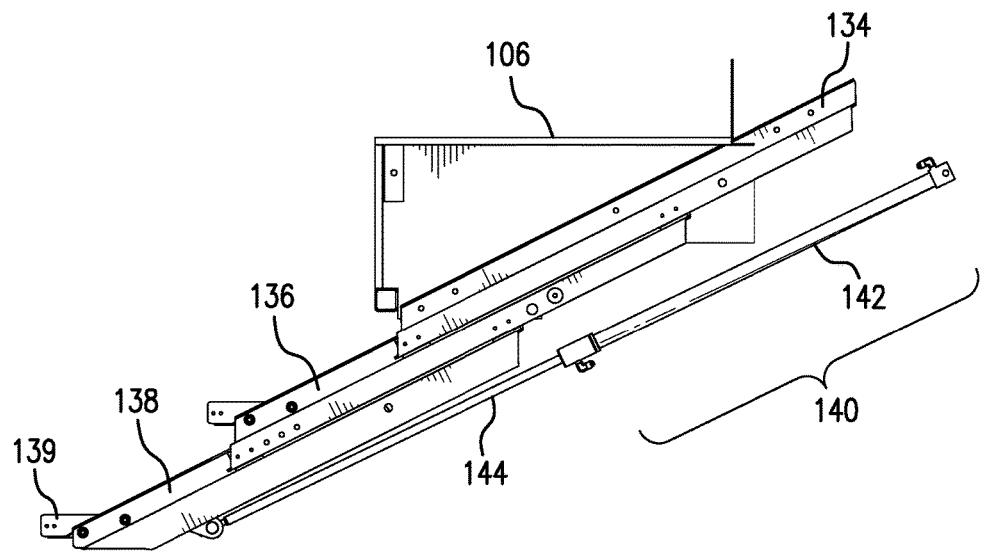
FIG. 8 is a close-up, side view of the retractable platform and staircase of FIG. 1 with the platform extended and the stairs extended.

Referring to FIG. 7, shown is retractable platform and staircase 100 fully retracted. Staircase 104 comprises of a pair of stationary rails 134, a first set of sliding rails 136, and a second set of sliding 138. In between pair of stationary rails 134 are stationary steps 106. In between first set of sliding rails 136 is a step 137. In between second set of sliding rails 138 is a step 139. First set of sliding rails 136 extend telescopically from pair of stationary rails 134. Second set of sliding rails 138 extend telescopically from first set of sliding rails 136. Additional sets of sliding rails can be added to increase the length of staircase 104.

A second prime mover 140 is mounted on one end of platform 102 and another end to second set of sliding rails 136 (or to step 139 extending therebetween) for moving staircase 104 with respect to frame 102. Second prime mover 140 is a source of motive power for staircase 104. Second prime mover 140 can include a hydraulic cylinder and pneumatic cylinder, an electric cylinder, or the like. In the illustrated embodiment, second prime mover 140 is a hydraulic cylinder 140 connected to platform 102 and a piston 144 connected to a second set of sliding rails 136. The stroke and stationary mount for second prime mover 140 can change depending on its mounting location.

Figure 9:
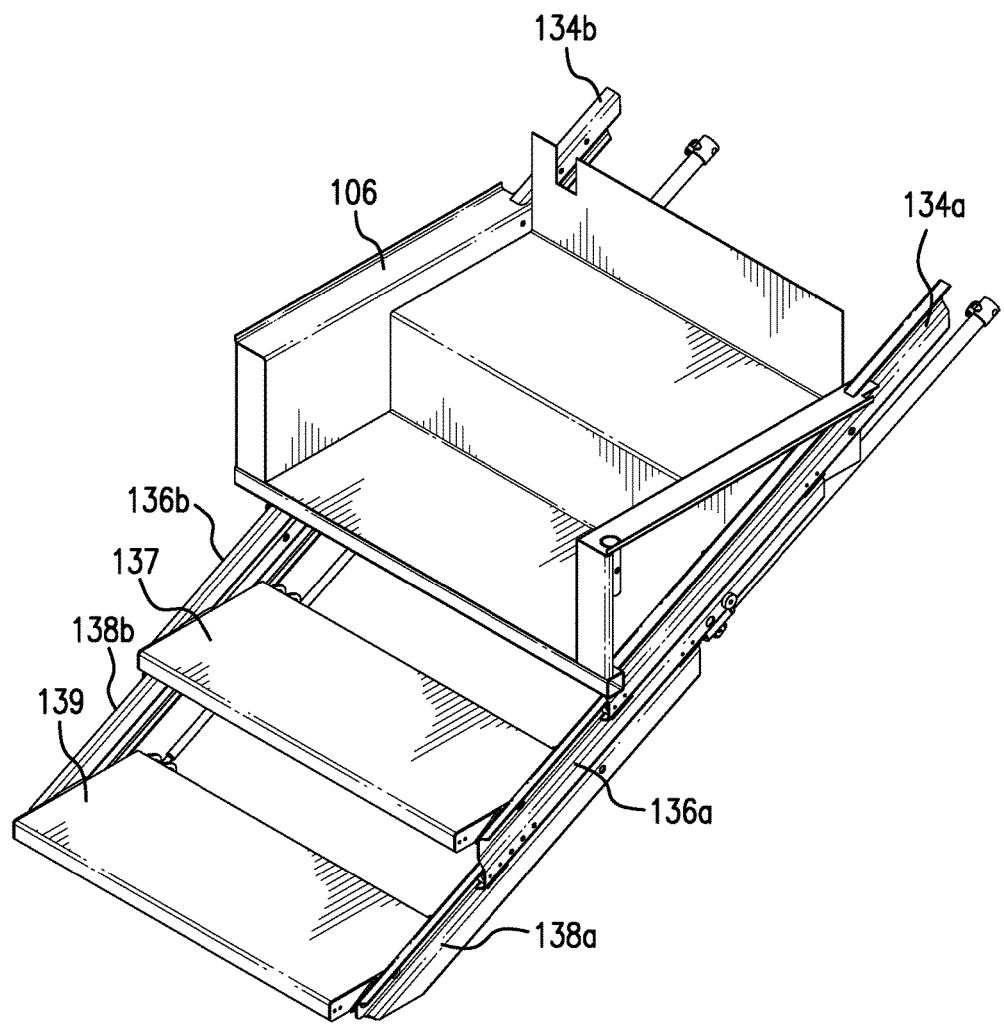
FIG. 9 is a perspective view of the retractable platform and staircase of FIG. 1 with the platform extended and the stairs extended.

FIG. 9 shows staircase 104 in more detail. Stationary steps 106 can include two stationary steps 106a,b. Stationary steps 106 are used to simplify the manufacture of staircase 104, though one skilled in art could have all the steps telescope into a more compact area. Stationary steps 106 are attached between each stationary rails 134 (comprising stationary rail 134a, 134b). First set of sliding rails 136 (comprising sliding rail 136a, 136b) are telescopically combined to stationary rails 134 with step 137 positioned between. Second set of sliding rails 138 (comprising sliding rails 138a, 138b) are telescopically combined to first sliding rails 136.

Figure 10:
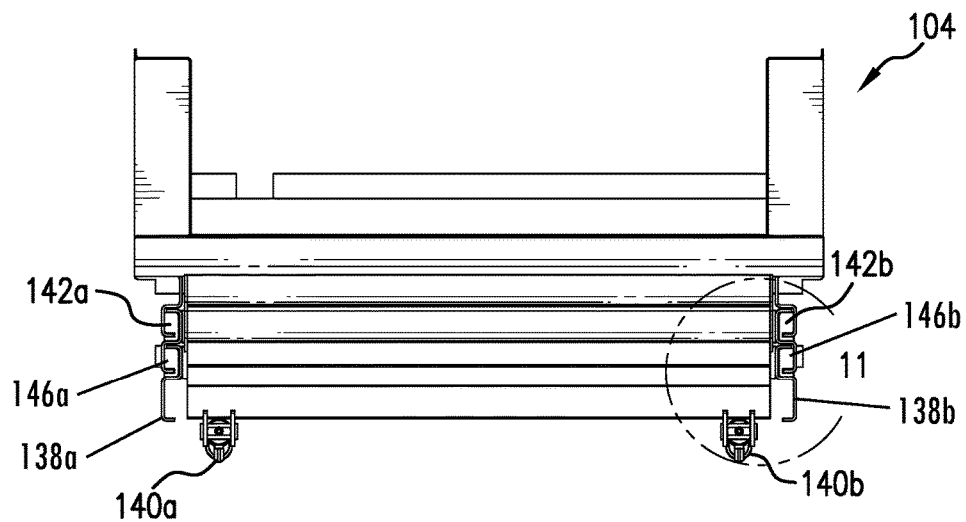
FIG. 10 is a rear view of the retractable platform and staircase of FIG. 1 with the platform extended and the stairs extended.
Figure 11:
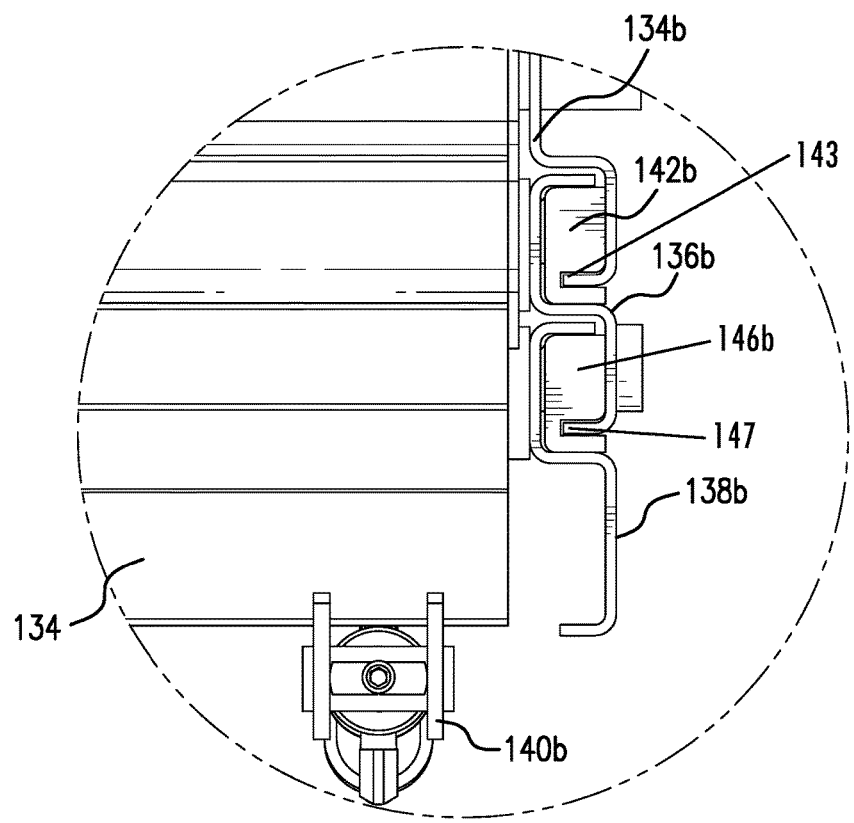
FIG. 11 is a close up view of Section 11 of FIG. 10.

FIGS. 10-11 show the rear side of staircase 104. Each stationary rail 134a, 134b overlaps one of the corresponding first sliding rails 136a, 136b. Movement of first sliding rails 136a, 136b is about a corresponding bearing pad 142a, 142b attached at a penetration end 143 of each of stationary rails 134a, 134b. This configuration secures bearing pads 142a, 142b to corresponding stationary rails 134a, 134b to provide a reduced friction sliding surface for first set of sliding rails 136 as they move between the retracted position and the extended position. An additional bearing pad is provided about half way up each of first stationary rails 134a, 134b. The two pads 142a, 142b on each of stationary rails 134a, 134b, respectively, maintains stationary rails 134a, 134b parallel with each other.

Each rail of the first set of sliding rails 136a, 136b moves parallel with respect to stationary rails 134. Bearing pads 142a, 142b align the respective first set of sliding rails 136 with respect to stationary rails 134 for the parallel movement. Step 137 is combined at each side to one of the rails of first set of sliding rail 136a, 136b, and configured parallel with respect to the ground. Combining step 137 to each one of first set of sliding rail 136a, 136b further secures first set of sliding rails 136 for parallel movement with each other, and also maintains the parallel position of step 137. In this regard, step 137 maintains a consistent parallel motion as step 137 moves between the respective positions, and in the extend position is positioned parallel with respect to the ground. A second set of sliding rails 138 and step 139 operate the same way. FIGS. 11 and 12 show sliding rails 136a, 136b partially overlap the respective sliding rails 138a, 138b. Movement of second set of sliding rails 138 is about corresponding bearing pads 146a, 146b attached at a penetration end 147 of each of sliding rails 138a, 138b. This configuration secures bearing pads 146a, 146b to corresponding sliding rails 138a, 138b to provide a reduced friction sliding surface for second set of sliding rails 138 as they move between the retracted position and the extended position. An additional bearing pad is provided about half way up each of sliding rails 138a, 138b. The two pads 146a, 146b on each of sliding rails 138a, 138b, respectively, maintains sliding rails 138a, 138b parallel with each other. More or less sliding rails with steps can be added depending on the desired height of staircase 104.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

What is claimed is:

1. An apparatus for a recreational vehicle ("RV"), comprising:
    a frame mounted perpendicular with respect to a longitudinal length of the RV;
    a platform mounted to the frame for movement about the frame between a retracted position and an extended position extending from the RV;
    a first prime mover having a first end and a second end, the first end mounted to the platform and the second end mounted to the frame for moving the platform with respect to the frame;
    a retractable staircase combined to the platform comprising: a first stationary rail attached to the platform and a second stationary rail attached to the platform and a stationary step positioned between each of the first stationary rail and the second stationary rail, wherein the first stationary rail and the second stationary rail each extend outward and angled downward from the platform; a first sliding rail that extends telescopically from the first stationary rail and a second sliding rail that extends telescopically from the second stationary rail and a first step positioned between the first sliding rail and the second sliding rail, wherein the first sliding rail is constrained to parallel movement with respect to the first stationary rail and the second sliding rail is constrained to parallel movement with respect to the second stationary rail; a third sliding rail that extends telescopically from the first sliding rail and that is constrained to parallel movement with respect to the first sliding rail and a fourth sliding rail that extends telescopically from the second sliding rail and that is constrained to parallel movement with respect to the second sliding rail and a second step positioned between the second sliding rail and the third sliding rail, wherein the stationary step, the first step are oriented parallel to the longitudinal length of the RV;
    a second prime mover having a first end and a second end, the second prime mover combined to the platform at the first end and to the retractable staircase at the second end, to move the retractable staircase between an extended position and a retracted position.

2. The apparatus of claim 1, wherein the retractable staircase further comprises:
    a first bearing pad combined to the first stationary rail and a second bearing pad combined to the second stationary rail; and
    the first sliding rail engaged against the first bearing pad and the second sliding rail engaged against the second bearing pad, wherein the first bearing pad and the second bearing pad provide a reduced friction sliding surface for the first sliding rail and the second sliding rail respective.

3. The apparatus of claim 2, and further comprising a third bearing pad attached to the first sliding rail, a fourth bearing pad attached to the second sliding rail, the third sliding rail engaged against the third bearing pad, the fourth sliding rail engaged against the fourth bearing pad, and a second step between the third sliding rail and the fourth sliding rail, wherein the third bearing pad and the fourth bearing pad provide a reduced friction sliding surface for the third sliding rail and the fourth sliding rail respectively.

4. The apparatus of claim 2, wherein the first stationary rail and the second stationary rail are each formed with a penetration end that engages by penetration the respective first bearing pad and the second bearing pad, wherein the first sliding rail telescopes from the first stationary rail, and wherein the second sliding rail telescopes from the second stationary rail, sliding rail, and further comprising a third bearing pad attached to the first sliding rail, a fourth bearing pad attached to the second sliding rail, the third sliding rail engaged against the third bearing pad, the fourth sliding rail engaged against the fourth bearing pad, and a second step between the third sliding rail and the fourth sliding rail.

5. The apparatus of claim 4, wherein the first stationary rail, the second stationary rail, the first sliding rail, and the second sliding rail each comprise an s-shaped profile having a top portion that opens outward and a bottom portion that opens inward, wherein the top portion of the first sliding rail is overlapped with the bottom portion of the first stationary rail and the top portion of the second sliding rail is overlapped with the bottom portion of the second stationary rail.

6. The apparatus of claim 4, wherein the third sliding rail and the fourth sliding rail each comprise an s-shaped profile having a top portion that opens outward and a bottom portion that opens inward, wherein the top portion of the third sliding rail is overlapped with the bottom portion of the first sliding rail and the top portion of the fourth sliding rail is overlapped with the bottom portion of the second sliding rail.

7. The apparatus of claim 1, wherein the first prime mover extends the platform before the second prime mover extends the retractable staircase, and the second prime mover retracts the retractable staircase before the first prime mover retracts the platform.

8. The apparatus of claim 1, wherein the frame comprises of two parallel tracks and a longitudinal bar extending therebetween mounted to an underside of the RV, and wherein the platform further comprises of two parallel rails each of which is mounted to one of the two parallel tracks of the frame and a deck that extends between the two parallel rails.

9. The apparatus of claim 8, and further comprising a pair of cross members mounted above the deck of the platform and perpendicular to the parallel rails of the frame to the apparatus to the underside of the RV.

* * * * *